UNITED STATES PATENT OFFICE.

ROBERT W. CORNELISON, OF BLOOMFIELD, NEW JERSEY.

COMPOSITION FOR COLORING OR PAINTING.

No. 816,648.　　　Specification of Letters Patent.　　　Patented April 3, 1906.

Application filed October 24, 1903. Serial No. 178,366.

*To all whom it may concern:*

Be it known that I, ROBERT W. CORNELISON, a citizen of the United States, residing at Bloomfield, in the county of Essex and State of New Jersey, have invented a new and useful improvement in composition for coloring or painting, which is in the nature of improved artists' water-colors and may be used for imparting colors to any surfaces and which is also useful in decorating and coloring walls and similar surfaces and by the use of which a tough hard horny coating is imparted, but which is not intended to be used on plaster walls, of which the following is a specification.

My invention consists of what may be designated as an improved "water-color" compound.

The general method heretofore employed in preparing water-colors has been to take a solid substance which is not soluble in water and grind it to a very fine state of subdivision. The coloring pigment so ground is thus suspended in water and does not go into solution. In my improved compound the coloring-matter does not consist of pigment suspended in water, but consists of highly-colored substances which are soluble in water. These substances are dissolved in water and worked into a pasty mass with starch to which gum-tragacanth and other substances are added.

In preparing my improved coloring compound the following proportions will be found to produce generally good results: Take twenty-four pounds of wheat-starch and stir into twenty-four pounds of water. To this add forty-eight pounds of gum-tragacanth mucilage, (prepared by dissolving one pound of gum-tragacanth in sixteen pounds of water.) Then add eight ounces of glycerin and three ounces of beta-naphthol. These ingredients are to be throughly stirred and to be heated until the starch is expanded. When this has been done, twelve pounds of propyl alcohol are to be added, and to this mass, or such portion of it as may be desired, the requisite quantity of any desired dye is to be added after having been first dissolved in a small quantity of water. The ingredients are to be thoroughly mixed, and it will be well to pass them through a paint-mill.

In case it is desired to imitate the effect of ordinary pigment with my colored compound some white pigment, such as basic carbonate of lead, may be added. This will produce an opaque horny coating on the object to which it is applied, and the dye which has been mixed with it gives it the required hue or color. The effect to all intents and purposes is the same as if the pigment itself were a colored pigment and not simply a white pigment, seeming to be colored because of its being embedded in a translucent colored binding medium.

In applying my improved composition for the ordinary purposes to which water-colors are applied—that is, for making decorative designs or other painting—the artist may take any number of these colors and compound them to about every shade which may be desired, either in a transparent stain or color or in what to all intents and purposes would appear to be a common pigment-color compound.

The surface coated by the use of my improved composition may also be varnished, if desired, without impairing the effect of the color.

The starch is used for the purpose of acting as a binder to hold the color on the surface to which it is applied and to prevent the solution from running—*i. e.*, being carried into portions of the surface to which it is applied which it is not desired to color. The beta-naphthol and alcohol impart antiseptic qualities to the composition.

While specific proportions have been given in this specification, it is not intended to limit the invention to the exact proportions specified, as these may be varied according to the quality of the work, &c., for which they are to be used; but,

Having thus described my invention, what I claim as new, and desire to secure by Letters Patent, is—

1. A water-color composition consisting of water, starch, gum-tragacanth, glycerin, an alcohol and beta-naphthol together with suitable coloring-matter soluble in water, substantially as described.

2. In a water-color composition such as described, a farinaceous base with suitable coloring-matter soluble in water, in combination with glycerin, an alcohol and beta-naphthol, substantially as described.

3. In a water-color composition such as described, a suitable farinaceous base with suitable coloring-matter in combination with an antiseptic consisting of beta-naphthol and an alcohol substantially as described.

4. A water-color composition consisting of water, starch, gum-tragacanth, glycerin, propyl alcohol and beta-naphthol together with suitable coloring-matter soluble in water, substantially as described.

ROBERT W. CORNELISON.

Witnesses:
ANNA BUCHNER,
HARRY W. ACTON.